US012066132B2

United States Patent
Muroi

(10) Patent No.: US 12,066,132 B2
(45) Date of Patent: Aug. 20, 2024

(54) PIPE JOINT

(71) Applicant: TOZEN Corporation, Saitama (JP)

(72) Inventor: Hitoshi Muroi, Saitama (JP)

(73) Assignee: TOZEN Corporation, Saitama (JP)

( * ) Notice: Subject to any disclaimer, the term of this patent is extended or adjusted under 35 U.S.C. 154(b) by 46 days.

(21) Appl. No.: 17/890,679

(22) Filed: Aug. 18, 2022

(65) Prior Publication Data

US 2023/0061916 A1   Mar. 2, 2023

(30) Foreign Application Priority Data

Aug. 25, 2021 (JP) .................... 2021-137256

(51) Int. Cl.
*F16L 21/06* (2006.01)
*F16L 17/04* (2006.01)

(52) U.S. Cl.
CPC .................... *F16L 21/06* (2013.01)

(58) Field of Classification Search
CPC . F16L 17/04; F16L 17/02; F16L 21/06; F16L 21/065
See application file for complete search history.

(56) References Cited

U.S. PATENT DOCUMENTS

| 4,861,075 | A | 8/1989 | Pepi et al. | |
|---|---|---|---|---|
| 2014/0125054 | A1* | 5/2014 | Schell | F16L 17/04 285/364 |
| 2020/0088327 | A1 | 3/2020 | Lippka | |
| 2020/0088330 | A1* | 3/2020 | Lippka | F16L 17/04 |

FOREIGN PATENT DOCUMENTS

| CN | 101255938 A | 9/2008 |
|---|---|---|
| GB | 1129246 A | 10/1968 |
| JP | 2007278456 A | 10/2007 |
| JP | 2008032213 A | 2/2008 |
| JP | 2009513914 A | 4/2009 |
| JP | 2011117470 A | 6/2011 |
| JP | 2019504249 A | 2/2019 |
| JP | 2019504259 A | 2/2019 |
| JP | 2019132425 A | 8/2019 |
| WO | 2008008088 A2 | 1/2008 |
| WO | 2017091461 A1 | 6/2017 |
| WO | 2017132036 A1 | 8/2017 |

OTHER PUBLICATIONS

Office Action issued in Japanese Patent Application No. 2021-137256 dated Dec. 20, 2023 (including English machine translation).
Notification of Grant issued in JP 2021-137256 on Apr. 17. 2024.

* cited by examiner

*Primary Examiner* — Aaron M Dunwoody
(74) *Attorney, Agent, or Firm* — TROUTMAN PEPPER HAMILTON SANDERS LLP

(57) ABSTRACT

In the present invention, a pipe joint has housing parts as a housing obtained by dividing the housing into three parts in a circumferential direction. The first housing part has connecting parts. The second, third housing parts have connecting parts, respectively. Connecting parts are provided to be detachably mutually connected by fastening with tightening members, at end parts protruding outward from vicinities of an inner peripheral surface with a sealing member arranged in sides opposite to sides of the first housing part.

1 Claim, 6 Drawing Sheets

PIPE JOINT

CROSS REFERENCE TO RELATED APPLICATION

The present application claims priority of Japanese Patent Application No. 2021-137256 filed Aug. 25, 2021. The entire contents of which are hereby incorporated by reference.

TECHNICAL FIELD

The present invention relates a pipe joint, more specifically the technique of the joint structure that has the pipe joint with the housing divided into three parts in the circumferential direction and allows to connect the mutually-facing end parts of one pipe and the other pipe for transferring fluid (liquid or gas) while ensuring sealing property by use of a sealing member interposed such as a gasket.

BACKGROUND

The technique disclosed in JP 2019-132425 has been known as such technique. The technique discloses the pipe joint structure for pipes, including the first pipe and the second pipe, the housing that is freely divided into some parts and surrounds the connecting parts of the both pipes from the outside, and the rubber ring interposed between the housing and the connecting parts of the both pipes (scope of claim for patent, FIG. 1). The technique discloses the embodiments including the housing divided into two parts and further the housing divided into three parts (FIG. 9 to FIG. 11).

In JP 2019-132425, two housing parts out of the three housing parts of the divided housing are connected to each other with a pin at the end parts, and the remaining housing part is connected to the two housing parts with a bolt. This structure has a lot of connecting points and requires a lot of connecting members, resulting in that the operability and workability in assembling is poor.

SUMMARY

The present invention solves the conventional problem described above, and is to provide the pipe joint that is excellent in operability and workability and enables the work of assembling a housing easily and in a short time.

In order to solve the problem described above, in one aspect of the invention, the pipe joint is configured to surround and connect mutually-facing end parts of one pipe and the other pipe from outside with a ring-shaped housing, and to ensure sealing performance by use of a sealing member arranged on an inner peripheral surface of the housing. The housing has housing parts obtained by dividing the housing into three parts in a circumferential direction. A first housing part has connecting parts formed in recessed shapes or projecting shapes at end parts protruding outward from vicinities of the inner peripheral surface with the sealing member arranged. A second housing part and a third housing part have connecting parts formed in recessed shapes or projecting shapes to be detachably connected to the connecting parts of the first housing part via recess-projection fitting, at end parts protruding outward from vicinities of the inner peripheral surface with the sealing member arranged in sides of the first housing part, and further have connecting parts to be detachably mutually connected by fastening with a tightening member, at end parts protruding outward from vicinities of the inner peripheral surface with the sealing member arranged in sides opposite to the sides of the first housing part.

In one aspect of the invention disclosed in the pipe joint according to the above, the connecting parts formed in projecting shapes at the end parts of the second housing part and the third housing part are provided as connection projecting parts in substantially L shapes, and the connecting parts formed in recessed shapes at the end parts of the first housing part are provided as connecting holes to be loosely fitted and connected to the connection projecting parts.

In one aspect of the invention, the second housing part and the third housing part have grooves for sealing member on the inner peripheral surfaces. The grooves for sealing member are inclined outward from the connecting parts connected to the first housing part toward the connecting parts connected mutually, at a predetermined angle relative to outside surfaces of the second housing part and the third housing part. The grooves for sealing member shift from inclined states to straight states when the connecting parts of the second housing part and the third housing part are fastened with the tightening member.

In one aspect of the invention disclosed according to the above, the connection projecting parts and the connecting holes are loosely fitted so as to allow the grooves for sealing member of the second housing part and the third housing part to shift from inclined states to straight states relative to a groove for sealing member of the first housing part.

As described above, the housing has the housing parts obtained by dividing the housing into three parts in the circumferential direction. The first housing part has the connecting parts formed in recessed shapes or projecting shapes at the end parts protruding outward from the vicinities of the inner peripheral surface with the sealing member arranged. The second housing part and the third housing part have the connecting parts formed in recessed shapes or projecting shapes to be detachably connected to the connecting parts of the first housing part via recess-projection fitting, at the end parts protruding outward from the vicinities of the inner peripheral surface with the sealing member arranged in the sides of the first housing part, and further have the connecting parts to be detachably mutually connected by fastening with the tightening member, at the end parts protruding outward from the vicinities of the inner peripheral surface with the sealing member arranged in the sides opposite to the sides of the first housing part. Accordingly, the present invention enables to assemble the pipe joint simply by making the connecting parts fitted via recess-projection fitting and fastening the connecting parts at one position, and thus enables the work of assembling the housing easily and in a short time compared to the conventional housing assembling. This achieves excellent operability and workability.

According to the aspect of the invention, the recess-projection fitting of the connecting parts is able to be conducted simply by inserting the connection protruding parts in substantially L shapes into the connecting holes for connection. Accordingly, the connection work is conducted smoothly.

According to another aspect of the invention, the fastening of the connecting parts with the tightening member allows the grooves for sealing member of the second housing part and the third housing part to shift to the straight states relative to the groove for sealing member of the first housing part. Accordingly, the sealing member installed inside the inner peripheral surface of the housing is free from the load causing deformation, thereby allowing to maintain excellent sealing performance.

According to the aspect of the invention disclosed above, the configuration allowing loose fitting between the connection projecting parts and the connecting holes allows to maintain effective connection while ensuring the movement of the connecting parts.

DETAILED DESCRIPTION

Hereinafter, the pipe joint according to one embodiment of the present invention will be described with reference to the drawings.

Figure 1:
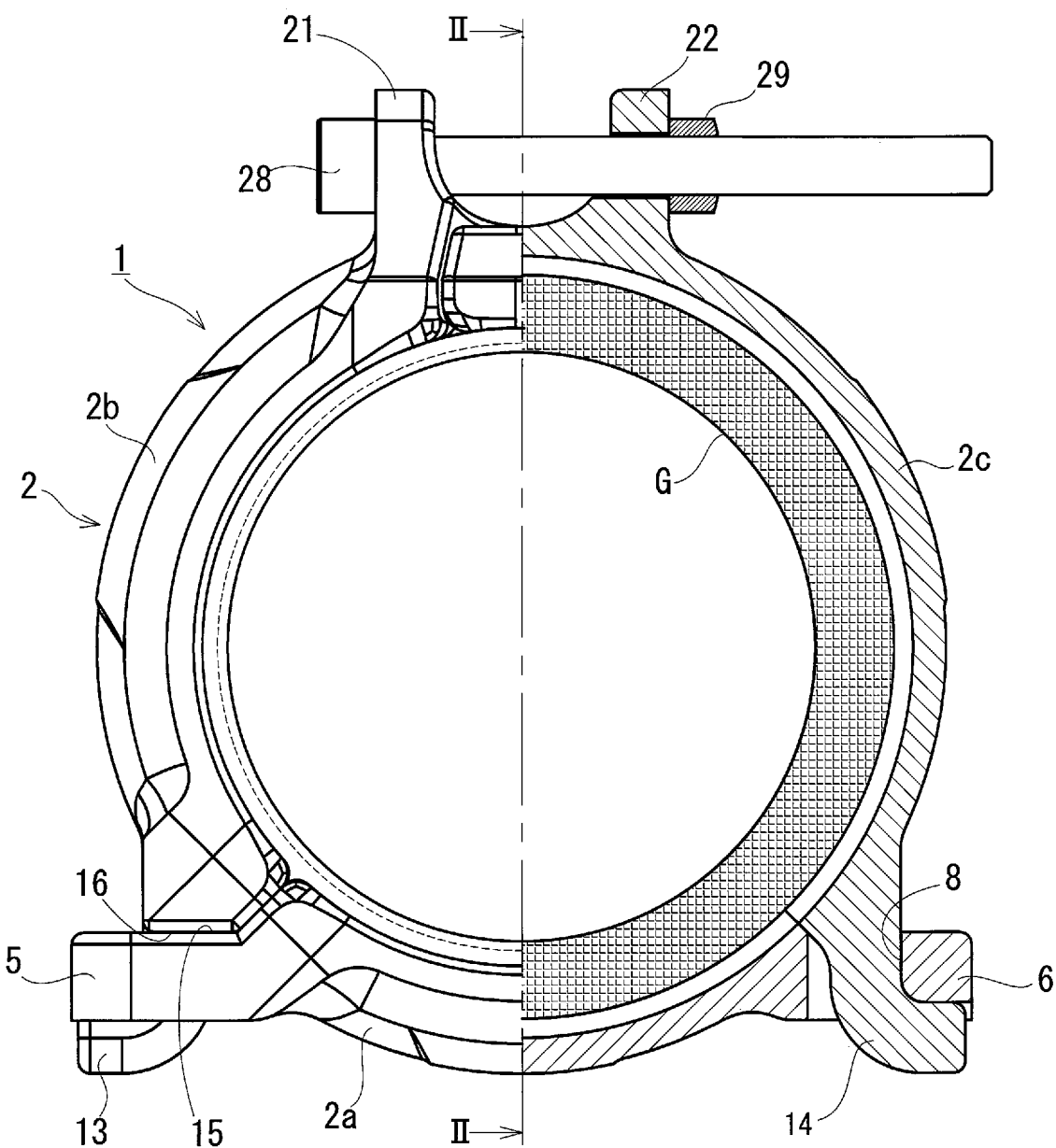
FIG. 1 is a front view of a pipe joint according to one embodiment of the present invention with the right half of the pipe joint broken.
Figure 2:
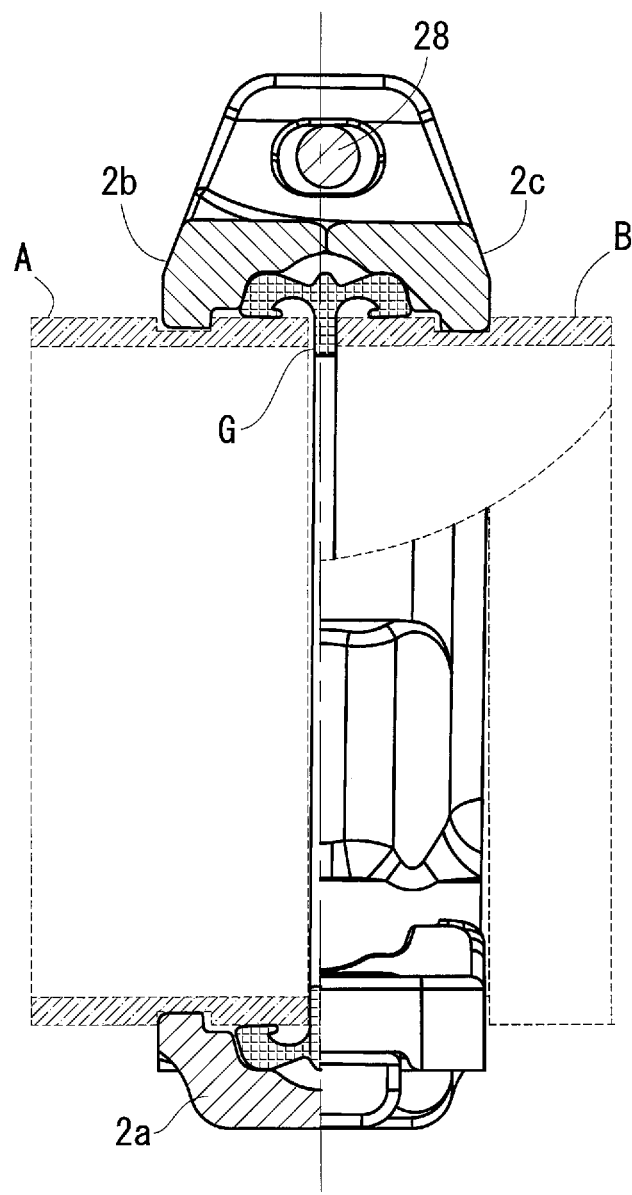
FIG. 2 is a sectional view of the pipe joint cut along a line II-II shown in FIG. 1.

Each of FIG. 1 and FIG. 2 shows the pipe joint denoted by 1. The pipe joint 1 is configured to connect the mutually-facing pipe end parts of one pipe A and the other pipe B for transferring fluid (liquid or gas) with a gasket G interposed, which serves as a sealing member. The pipe joint 1 has housing parts 2a, 2b, 2c obtained by dividing a housing 2, which serves as a ring-shaped joint main body, into three parts in the circumferential direction.

Figure 3:
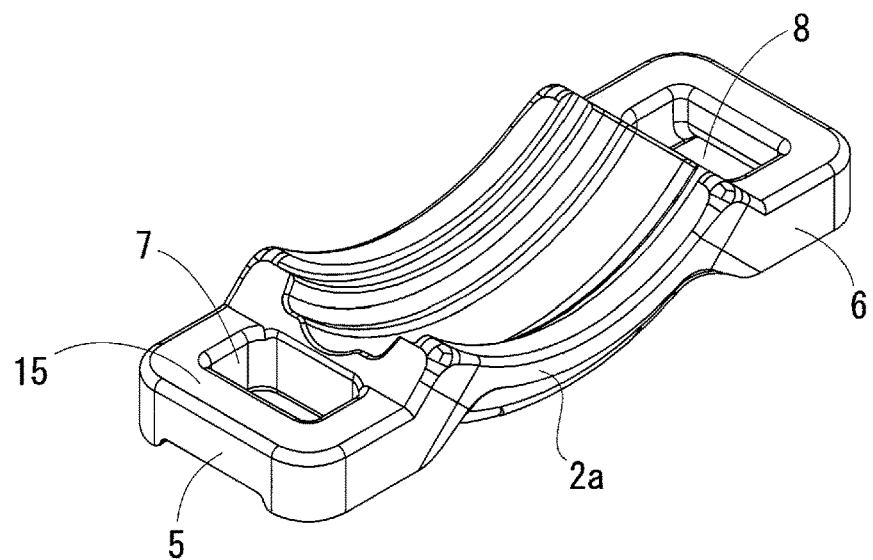
FIG. 3 is a perspective view of a first housing part of the same embodiment.

In FIG. 1 and FIG. 2, the housing part 2a is configured as the bottom part of the housing 2, and has connecting parts 5, 6 that are disposed at both end parts in the longitudinal direction so as to protrude outward from vicinities of the inner peripheral surface corresponding to the side on which the gasket G is arranged. The connecting parts 5, 6 have locking holes 7, 8, respectively, which are configured to be connected to the connecting parts to be described later of the housing parts 2b, 2c, respectively. The locking holes 7, 8 are the through holes formed in substantially long square shapes in a plane view (FIG. 3).

Figure 4:
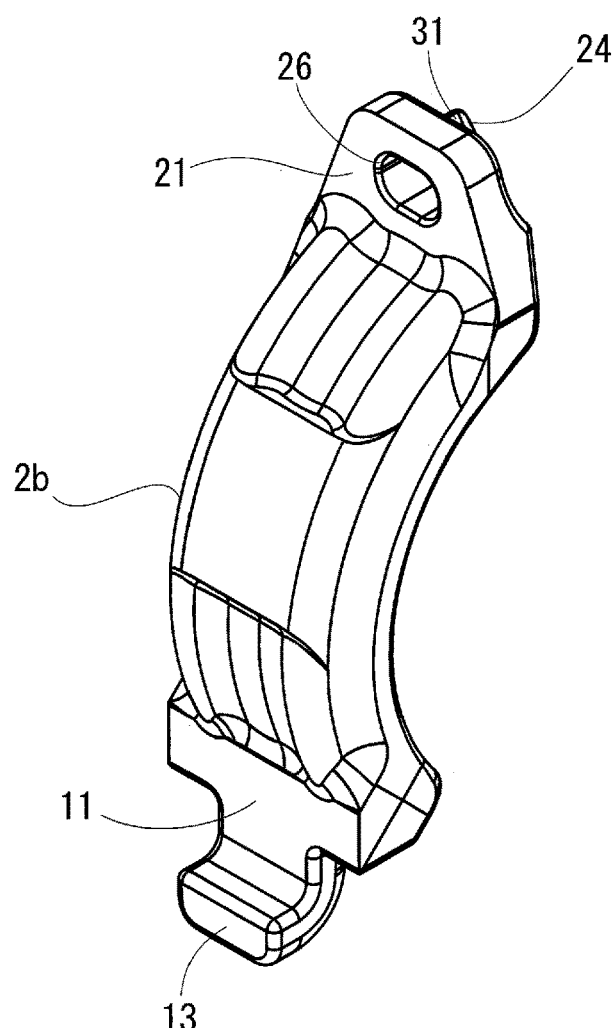
FIG. 4 is a perspective view of a second housing part of the same embodiment.
Figure 5:
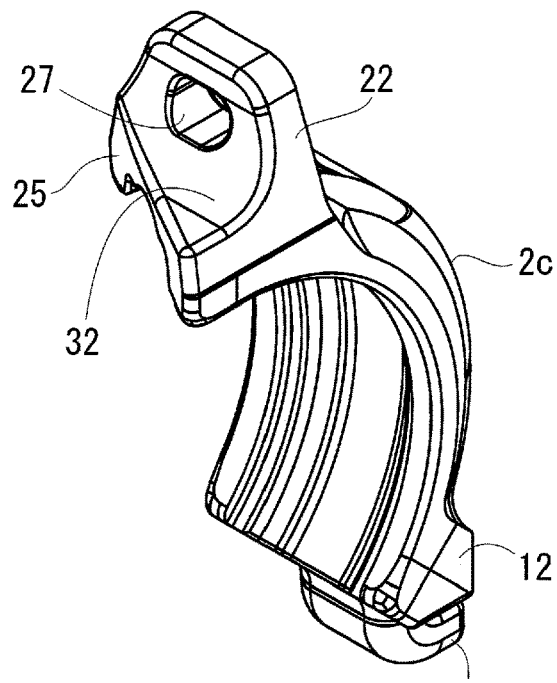
FIG. 5 is a perspective view of a third housing part of the same embodiment.

In FIG. 1 and FIG. 2, the housing parts 2b, 2c are configured as the parts extending from the sides to the top of the housing 2, and provided symmetrically in an arch shape in a front view on the housing part 2a. The housing parts 2b, 2c have connecting parts 11, 12 that are disposed at the respective end parts in the sides of the housing part 2a so as to protrude outward from vicinities of the inner peripheral surface corresponding to the side on which the gasket G is arranged. The connecting parts 11, 12 have locking projecting parts 13, 14, which are formed in substantially L shapes and configured to be inserted into and fitted to the locking holes 7, 8 of the housing part 2a so as to be locked therein by fitting (FIG. 4 and FIG. 5). That is, such fitting and locking of the locking projecting parts 13, 14 in the locking holes 7, 8 allows to connect one end parts of the housing parts 2b, 2c to the corresponding end parts of the housing part 2a, and this configuration eliminates the need for any fitting member or any tightening member such as a pin or a bolt and a nut when connecting. When the connecting parts 5, 6 of the housing part 2a are connected to the connecting parts 11, 12 of the housing parts 2b, 2c, the joint surfaces on which the locking holes 7, 8 are connected to the locking projecting parts 13, 14 are the flat surfaces 15, 16 (FIG. 1).

Figure 6:
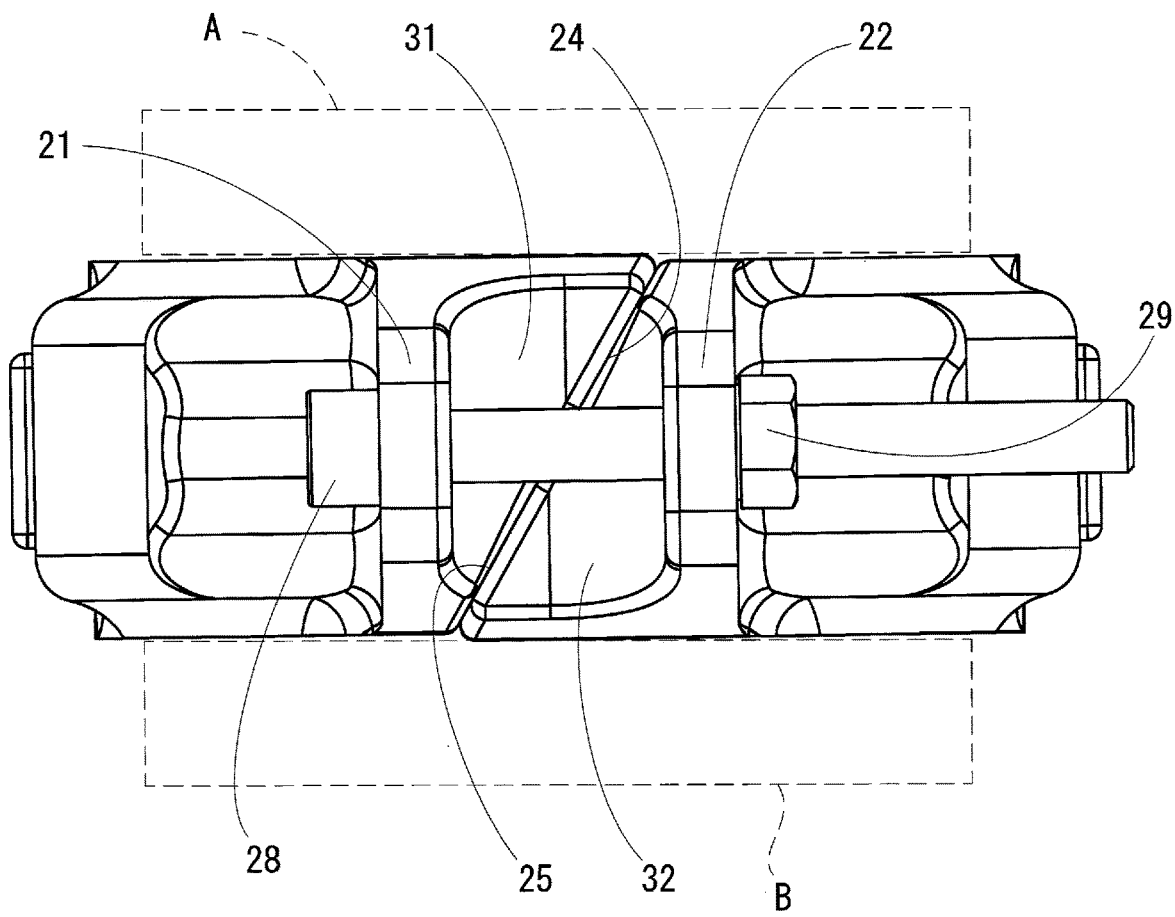
FIG. 6 is a plane view of the same embodiment.

The housing part 2b, 2c further have connecting parts 21, 22 that are disposed at the end parts opposite to the side of the housing part 2a so as to protrude outward from vicinities of the inner peripheral surface corresponding to the side on which the gasket G is arranged. As shown in FIG. 6, the connecting parts 21, 22 respectively have tapered surfaces 24, 25 that are disposed so as to face each other in a plane view. That is, the connecting parts 21, 22 are formed in the shapes erected from the vicinities of the base ends of the tapered surfaces 24, 25. The connecting parts 21, 22 respectively have bolt insertion holes 26, 27, and are configured to be fixed when a bolt 28 is inserted into the bolt insertion holes 26, 27 and tightened with a nut 29. When the housing parts 2b, 2c are fastened with the bolt 28 and the nut 29, the tapered surfaces 24, 25 are brought into contact with each other and positioned. That is, when the housing parts 2b, 2c are fastened with the bolt 28 and the nut 29, the housing parts 2b, 2c slide in the mutually approaching directions to predetermined positions. Thus, angled bolt pad parts 31, 32 are provided as parts of the connecting parts 21, 22.

When the angled bolt pad parts 31, 32 provided as parts of the connecting parts 21, 22 as described above, the tapered surfaces 24, 25 of the bolt pad parts 31, 32 of the housing part 2b and the housing part 2c are opposed to each other. The angles between the tapered surfaces 24, 25 and a center axis of the housing 2 are 30°. As shown in FIG. 6, according to the relation of reverse inclination between the bolt pad parts 31, 32 of the housing part 2b and the housing part 2c, the tapered surfaces 24, 25 are formed to have the inclination allowing that the surfaces are positioned so as to face to each other. When the bolt 28 and the nut 29 are tightened so as to fit the arch shaped surfaces onto the outer surfaces of pipe elements, the bolt pad parts 31, 32 of the housing parts 2b, 2c are engaged with each other and slid mutually and relatively, so that the housing parts 2b, 2c are made to approach to each other, and further made to relatively rotate in the opposite directions around the axis perpendicular to the axis of the pipe elements to be connected. As described above, these types of movement of the housing parts 2b, 2c allow the arch shaped surfaces to be engaged with gasket grooves of the pipe elements, and further add rigidity to all of the shafts of the joint. In the joint housing having the bolt pad parts 31, 32 with the tapered surfaces inclined at the same angle, the joint parts move mutually and relatively in the opposite directions along the pipes so as to obtain the same effect.

Figure 7:
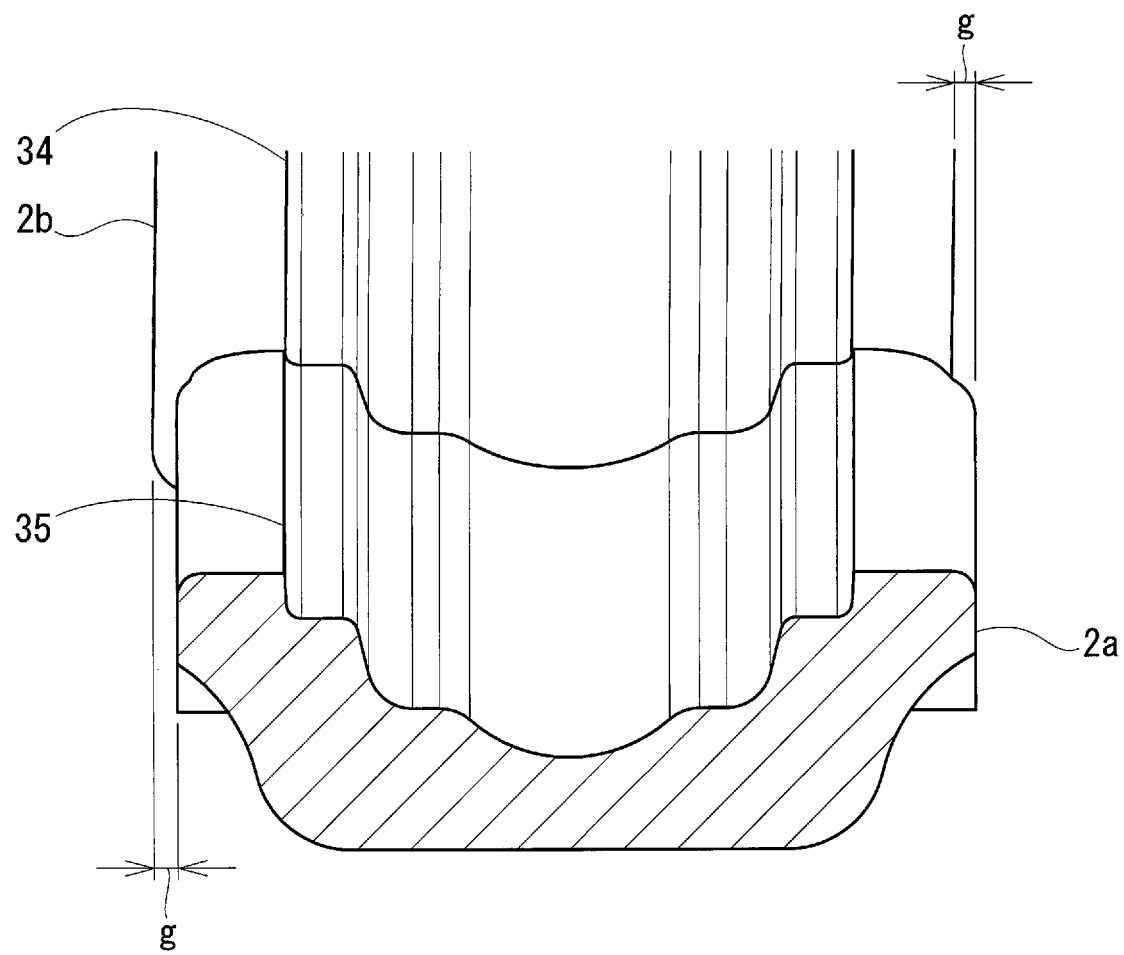
FIG. 7 is a view of parts with gaps between the first housing part and the second housing part and between the first housing part and the third housing part.
Figure 8:
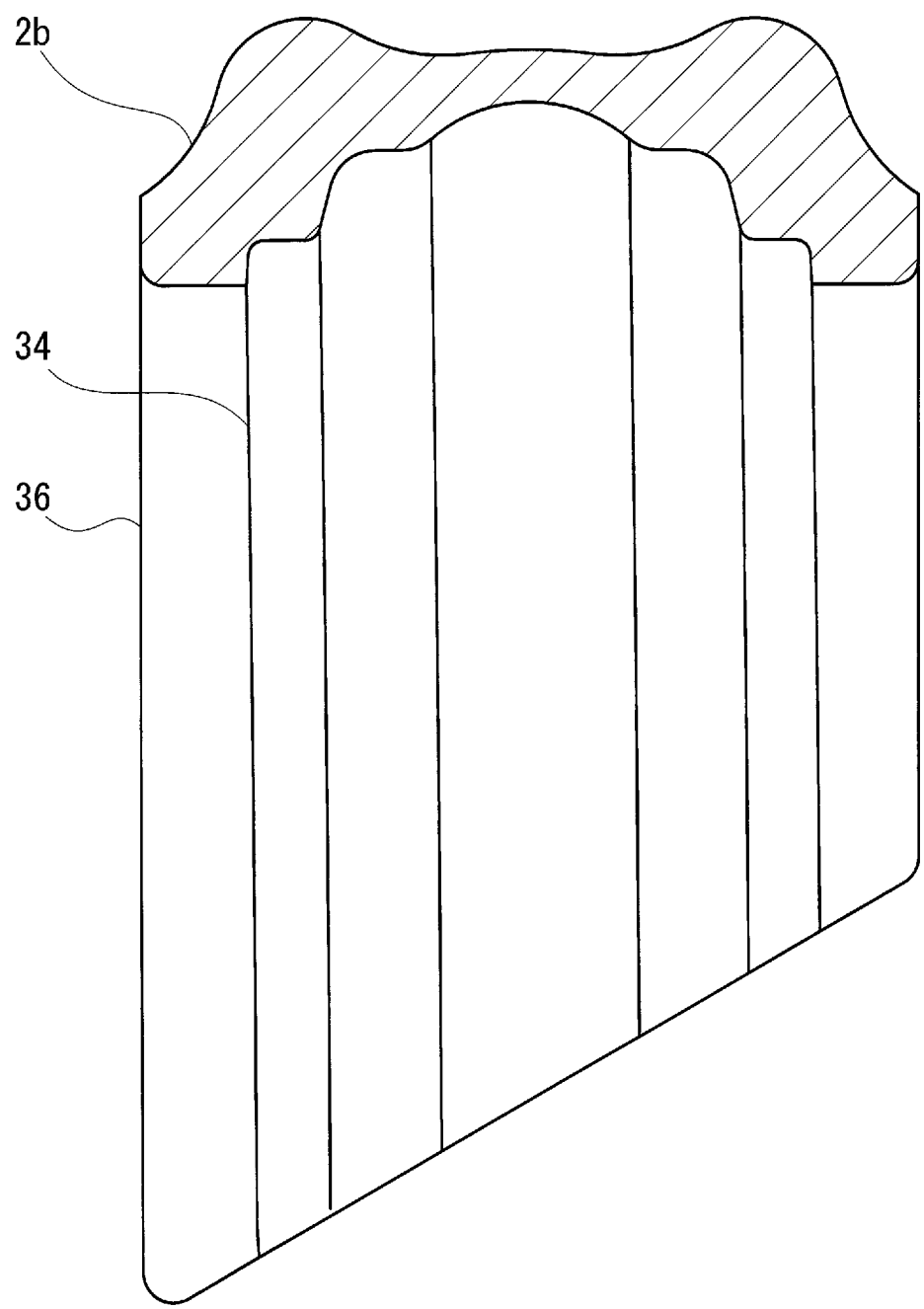
FIG. 8 is an enlarged view of gasket grooves formed on inner peripheral surfaces of the second housing part and the third housing part.

As shown in FIG. 7, a gap g is previously provided between the outside surfaces of the housing part 2a and the housing part 2b and also between the outside surfaces of the housing part 2a and the housing part 2c. That is, a gasket groove 35 formed on the inner peripheral surface of the housing part 2a and a gasket groove 34 formed on the inner peripheral surface of the housing part 2b are connected so as to extend straight as shown in the figure when the bolt 28 and the nut 29 are tightened. In this state, there is the gap g between the housing part 2a and the housing part 2b as shown in the figure. On the other hand, before the bolt 28 and the nut 29 are tightened, the gasket groove 34 and the gasket groove 35 are in the state where as shown in FIG. 8 the gasket groove 34 of the housing part 2b is inclined at a predetermined angle relative to an outside surface 36 of the housing part 2a, not in the straight connected state. The predetermined angle described above is approx. 1° in the present embodiment. Therefore, the inclination is hardly recognized in FIG. 8. The angle of approx. 1° is merely an example, and thus an appropriate value may be set.

The amount of the gap g depends on the predetermined angle of the gasket groove 35. The gasket grooves between the housing part 2a and the housing part 2c, not shown, are provided in the same manner. The gasket grooves 34, 35 herein refer to the lines indicating the corners for positioning the gasket when installing the gasket G inside the housing 2. A plurality of the gasket grooves are formed along the direction of the center axis of the housing so as to have the same inclination angle (in parallel).

In the tightened state as described above, the gasket groove 34 extends straight relative to the gasket groove 35. Thus, the state hardly causes deformation of the gasket G that is installed inside the housing 2 and positioned by the gasket grooves. Accordingly, the sealing performance is not adversely affected by the deformation of the gasket caused by the inclination of the gasket grooves in the tightened state, resulting in that the sealing performance is improved.

In addition to the gap g described above, the locking holes 7, 8 and the locking projecting parts 13, 14 are configured to mutually fit with a little play (loose fitting). The fitting allows the gasket groove 34 of the housing part 2b to shift straight relative to the gasket groove 35 of the housing part 2a when the bolt 28 and the nut 29 are tightened. Accordingly, the gasket G, which is installed inside the housing 2, is maintained inside without deformation. In the prior art, in the pipe joint with the gasket installed inside, the gasket grooves are previously formed straight commonly in the housing parts. When the bolt and the nut are tightened, the housing parts slide, and displacement occurs between the gasket grooves. The displacement deforms the gasket, resulting in that the sealing performance is deteriorated. The present embodiment hardly generates such deterioration. This is because the gasket groove 34 of the housing part 2b is arranged so as to be inclined at a predetermined angle relative to the outside surface 36 of the housing part 2a.

Similarly, also in the case where the parts of the housing 2 fastened with the bolt 28 and the nut 29 slide in mutually separating directions due to the internal pressure from the gasket G, the configuration described above suppresses the gasket installed inside from sliding excessively.

In more detail, in order to prevent the gasket G from causing the deterioration of the sealing performance, the present embodiment has the following configuration. In one aspect of the embodiment, the angled bolt pad parts 31, 32 serve as the connecting end parts connecting between the housing part 2b and the housing part 2c, and the gasket groove 34 is formed to be previously inclined at a predetermined angle relative to the outside surface 36 of the housing part 2b, in order that the gasket groove 34 under the tightened state shifts to the straight state even when the tightening of the bolt 28 and the nut 29 makes the housing part 2b and the housing part 2c slid in the mutually approaching directions. In another aspect of the embodiment, with respect to the connecting end parts connecting between the housing part 2b and the housing part 2a and the connecting end parts between the housing part 2c and the housing part 2a, the locking projecting parts 13, 14 of the housing part 2b and the housing part 2c are respectively brought into loose fitting in the locking holes 7, 8 of the housing part 2a, and the loose fitting allows the gasket groove 34 to shift from the inclined state to the straight state relative to the gasket groove 35. The configuration enables to absorb the inclination of the gasket groove in the state of the housing fastened, and enables to maintain the sealing performance of the gasket.

As shown in FIG. 2, the pipes A, B, serving as pipe elements, are the grooved pipes respectively having the annular recessed grooves formed on the outer peripheral surfaces of the end parts. The pipes A, B are configured so that the annular projecting parts formed at the front and rear edges of the housing parts are fitted in the annular recessed grooves when the pipe joint 1 is attached on the pipes A, B. The center projecting part of the gasket G protrudes inward from the pipe end parts over the inner peripheral surfaces of the pipes, and thus the center projecting part of the gasket G stops the inserted pipes A, B.

Description of Action

The action of the pipe joint 1 will be described below.

In order that the housing parts 2b, 2c are assembled to the housing part 2a, as shown in the figure, the locking projecting parts 13, 14 of the housing parts 2b, 2c are inserted into the locking holes 7, 8 of the housing part 2a, and fitted and connected therein. At this time, since there is margin space above the housing parts 2b, 2c, the gasket G is installed inside the housing parts 2a, 2b, 2c so as to be attached along the respective gasket grooves. In this state, the gasket groove 34 is arranged to be inclined relative to the gasket groove 35, not to be straight. The locking projecting parts 13, 14 and the locking holes 7, 8 are in loose fitting state.

In the steps of attaching to the pipes A, B, first, the housing of the pipe joint fastened still loosely is arranged to be inserted and positioned at the mutually-facing end parts of the pipes A, B. Then, the annular projecting parts formed at the front and rear edges of the housing parts 2a, 2b, 2c are arranged to be fitted in the above-described annular recessed grooves of the pipes A, B.

Subsequently, the bolt 28 is inserted into the bolt insertion holes 26, 27 of the connecting parts of the housing parts 2b, 2c, and screwed with the nut 29 for tightening. With the tightening, the bolt pad parts 31, 32 move in the mutually-facing directions, so that the tapered surface 24 and the tapered surface 25 are brought into contact with each other, and slid and stop at predetermined positions on the surfaces. During the period, as described above, the gasket groove 34 shifts from the inclined state to the straight state relative to the gasket groove 35. Since the gasket grooves under the tightened state are kept in the straight state, the gasket G is thus suppressed from being deformed, resulting in that the sealing performance of the gasket G is maintained excellent. It is noted that under the tightened state in which the gasket groove 34 is straight relative to the gasket groove 35, the locking projecting parts 13, 14 loosely fitted in the locking holes 7, 8 are in contact with the hole end surfaces of the holes.

In the pipe joint 1 having the above-described configuration, the housing parts 2b, 2c and the housing part 2a are respectively fitted via recess-projection fitting between the locking projecting parts 13, 14 and the locking holes 7, 8. The use of the pipe joint 1 enables to reduce the number of components and improve efficiency in assembling, compared to the pipe joint configured with three divided parts in the prior art. Moreover, the processing includes only the steps of inserting the product to the grooved pipes A, B without dividing, and fastening the housing part 2b and the housing part 2c only at one position with the bolt 28 and the nut 29, and thus requires shorter period of time in assembling. This enables the work of assembling the housing parts easily and in a shorter time, and thus achieves excellent operability and workability.

It is noted that the configuration of the housing 2 indicated in the above embodiment is merely a preferable example, and the housing 2 may have another type of configuration. That is, the connecting parts of the housing parts 2a, 2b, 2c obtained by dividing the housing 2 into three parts may have other specific types of configuration than the ones shown in the figures. In an example, the locking holes 7, 8 indicated as examples of the connecting holes and the locking projecting parts 13, 14 indicated as examples of the connection projecting parts may have other types of configuration, including some modifications in shape, not limited to the examples shown in the figures, as long as the configuration achieves similar functions and effects. The components such as the bolt pad parts 31, 32 and tightening members, for example, the bolt and the nut, are also merely examples, and may be any other members as long as the components achieve similar effects. In the present invention, any change or modification in detailed designing and the like is available within the scope of the patent claims.

The invention claimed is:

1. A pipe joint configured to surround and connect mutually-facing end parts of one pipe and the other pipe from outside comprising:
   a ring-shaped housing, and
   a sealing member to ensure sealing performance and arranged on an inner peripheral surface of the housing,
   the housing comprising housing parts obtained by dividing the housing into three parts in a circumferential direction, wherein
   each of the housing parts comprises sealing member grooves configured to accept the sealing member on the inner peripheral surfaces to arrange the sealing member,
   a first housing part comprises connecting parts formed in recessed shapes at end parts protruding outward from vicinities of the inner peripheral surface with the sealing member arranged,
   a second housing part and a third housing part both comprising connecting parts formed in projecting shapes to be detachably connected to the connecting parts of the first housing part via recess-projection fitting, at end parts protruding outward from vicinities of the inner peripheral surface with the sealing member arranged in sides of the first housing part, and further have connecting parts to be detachably mutually connected by fastening with a tightening member, at end parts protruding outward from vicinities of the inner peripheral surface with the sealing member arranged in sides opposite to the sides of the first housing part,
   angled bolt pad parts are provided as the mutual connecting parts of the second housing part and the third housing part,
      tip surfaces of the angled bolt pad parts facing to each other have tapered surfaces that are reversely inclined at a first angle relative to the central axis of the housing and capable of contacting with and separating from, and
   the sealing member grooves of the second housing part and the third housing part are formed inclined outward from the connecting parts connected to the first housing part toward the connecting parts connected mutually, at a second angle relative to outside surfaces of the second housing part and the third housing part, and are inclined at the second angle relative to the sealing member grooves of the first housing part before the mutual connecting parts of the second housing part and the third housing part are fastened with the tightening member, and shift from inclined states to straight states when fastened with the tightening member.

* * * * *